US005640670A

United States Patent [19]

Samueli et al.

[11] Patent Number: 5,640,670

[45] Date of Patent: Jun. 17, 1997

[54] NARROW-BAND QUADRATURE DEMODULATOR FOR RECOVERING ANALOG VIDEO AND DIGITAL AUDIO IN A DIRECT BROADCAST SYSTEM

[75] Inventors: Henry Samueli, Northridge; Kenneth R. Kindsfater, Los Angeles, both of Calif.

[73] Assignee: Broadcom Corporation, Irvine, Calif.

[21] Appl. No.: 352,399

[22] Filed: Dec. 8, 1994

[51] Int. Cl.$^6$ .................................................. H04N 7/20

[52] U.S. Cl. ........................... 455/3.2; 348/738; 348/553

[58] Field of Search .............................. 455/3.2, 3.1, 6.3; 348/738, 553, 725; H04N 7/20, 7/52

[56] References Cited

U.S. PATENT DOCUMENTS

| | | | |
|---|---|---|---|
| 5,202,766 | 4/1993 | Mehrgardt et al. | 348/738 |
| 5,222,144 | 6/1993 | Whikehart | 381/15 |
| 5,418,815 | 5/1995 | Ishikawa et al. | 375/216 |

*Primary Examiner*—John K. Peng
*Assistant Examiner*—Nathan J. Flynn
*Attorney, Agent, or Firm*—Ellsworth R. Roston; Charles H. Schwartz

[57] ABSTRACT

A direct broadcast satellite sends subscribers signals received from an earth-station transmitter and typically having a 10 MHz bandwidth, 6 MHz for an analog video station and 4 MHz for up to 24 digital audio stations. When a subscriber selects one of the audio stations, an FM demodulator recovers the 10 MHz signal; a variable gain amplifier amplifies the received signal; and an A/D converter digitizes the amplified signal at (e.g.) 24.576 MHz. A digital synthesizer produces trigonometric functions (sine, cosine) at (e.g.) 24.576 MHz, and mixers downconvert the signals to baseband. The sampling frequency is then reduced to 256 KHz, twice the digital audio signal baud rate. In response to the 256 KHz signals, a first servo varies a VCO frequency to obtain a regulation by the A/D converter of the digitizing frequency at 24.576 MHz and another servo regulates the frequency of the trigonometric functions. A microcomputer provides a fixed coarsely amplified gain to the 256 KHz signals dependent upon the relative amplitudes of the video and audio signals. The amplitudes of the coarsely amplified signals are detected, filtered and converted to an analog voltage to precisely regulate the gain of the variable gain amplifier. The sampling frequency of the signals at the outputs of the programmable gain stages is reduced to 128 KHz (i.e. the transmitted baud frequency). A Viterbi decoder corrects errors in these in-phase and quadrature baseband "soft-decision" signals. The resulting 192 kb/s output data stream is decompressed and converted to stereo audio sound.

36 Claims, 4 Drawing Sheets

BASEBAND AFTER FM DEMODULATOR

NARROW-BAND QUADRATURE DEMODULATOR FOR RECOVERING ANALOG VIDEO AND DIGITAL AUDIO IN A DIRECT BROADCAST SYSTEM

This invention relates to a system which includes a direct broadcast satellite to provide an analog video signal and a plurality of digital audio signals in a range (e.g. 10 MHz) of frequencies. More particularly, the invention relates to a system for selecting the signals from one of the digital audio stations in such frequency range and for recovering such signals from the analog video signals and from the signals in the other digital audio stations in such frequency range.

BACKGROUND OF THE INVENTION

Direct broadcast systems are now in use for sending video and audio signals to subscribers. In such systems, a transmitter provides analog signals representing video images and digital signals representing audio information. The analog and digital signals from the transmitter are sent to a satellite which then relays the signals to subscribers at different locations. The receiver at a subscriber location then converts the analog signals to an image represented by such signals or converts the digital information to sounds represented by such signals. There are now about ten million (10,000,000) subscribers to digital broadcast systems in Europe.

In direct broadcast systems, the frequencies are divided into bands, each band having a range of approximately ten Megahertz (10 MHz). In each band, approximately six Megahertz (6 MHz) are used for the analog video signals for a video channel and the remaining four Megahertz (4 MHz) are used to provide digital audio signals for up to twenty four (24) audio channels, each having an individual and a limited range of frequencies within the frequency band. Each audio signal consists of a compressed digital bit stream incorporating forward error correction which is modulated using Quadrature Phase Shift Keying (QPSK) onto a subcarrier in the 6–10 MHz frequency band of the satellite transponder.

It is sometimes difficult at times to select a particular one of the audio channels in the frequency band. This results partly from the fact that the digital audio signals in the particular channel have a limited range of frequencies and have a relatively low power level, particularly in relation to the power level in the analog video signals in the same frequency band. This has caused noise to be mixed with the sound recovered from the digital audio signals. Because of this, the quality of the sound recovered from the audio signals in the particular channel is sometimes low. These problems have been known to exist for some time. A considerable effort has been made, and significant amounts of money have been expended in this effort, to resolve these problems. However, the problems continue to exist.

BRIEF DESCRIPTION OF THE INVENTION

This invention provides a system for overcoming the problems discussed in the previous paragraph. The system eliminates the effects of the analog video signals on the digital audio signals in the selected channel. The system also separates the digital audio signals in the selected channel from the digital audio signals in the other channels in the same frequency band. In this way, the sound reproduced from the digital audio signals is not degraded by noise from any of the other channels in the same frequency band.

In one embodiment of the invention, a direct broadcast satellite sends to subscribers signals received from an earth-station transmitter. The signals typically have a 10 MHz bandwidth, with 6 MHz allocated to an analog video station and 4 MHz allocated for up to 24 digital audio stations. When a subscriber selects one of the digital audio stations, an FM demodulator recovers the 10 MHz signal; a variable gain amplifier amplifies the received signal; and an analog-to-digital (A/D) converter digitizes the amplified signal at a particular sampling frequency (e.g. 24.576 MHz). A digital synthesizer produces trigonometric functions (sine and cosine) at the particular sampling frequency (e.g. 24.576 MHz), and mixers downconvert the signal to baseband. The sampling frequency of these digitized signals is then reduced to 256 KHz corresponding to twice the baud rate at which the digital audio signals are provided.

A first servo produces from the 256 KHz baseband signals an analog signal to vary a voltage controlled oscillator frequency. The oscillator introduces these frequency variations to the A/D converter to regulate the digitizing frequency at 24.576 MHz. A second servo operates upon the 256 KHz baseband signals and produces a control signal to regulate the frequency of the trigonometric functions which downconvert the digital audio signal to baseband.

A microcomputer programs a coarse gain control for the 256 Khz baseband signals to provide to these signals a fixed programmed gain dependent upon the relative amplitude of the analog video signal and the digital audio signals. The amplitudes of the coarsely amplified baseband signals are detected, filtered and converted to an analog control voltage to precisely regulate the gain of the variable gain amplifier preceding the A/D converter.

The signals at the outputs of the programmable gain stages are reduced in sampling frequency to 128 KHz which corresponds to the transmitted baud frequency. These in-phase and quadrature baseband "soft-decision" signals are output to a Viterbi decoder for error correction and the resulting 192 kb/s output data stream is decompressed and converted to stereo audio sound.

DETAILED DESCRIPTION OF THE INVENTION

Figure 1:
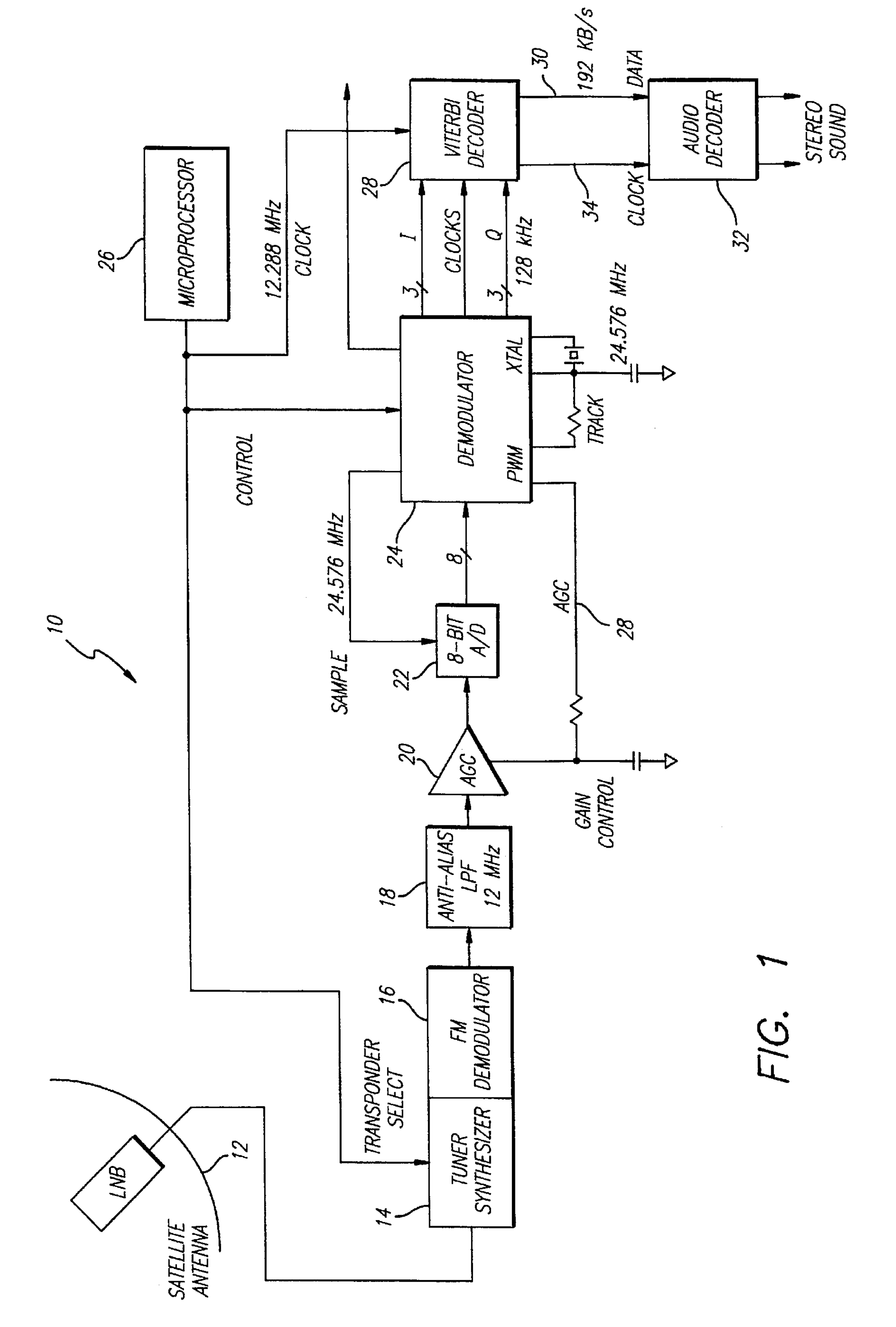
FIG. 1 is a simplified block diagram of a direct broadcast system constituting one embodiment of the invention.

FIG. 1 illustrates a direct broadcast system generally indicated at 10 and constituting one embodiment of the invention. The system 10 shown in FIG. 1 includes a satellite antenna 12 which receives signals broadcast from a ground station to a satellite transponder (not shown). The transponder produces signals in a frequency band having a range of approximately ten megahertz (10 MHz). As will be appreciated, a plurality of such frequency bands are provided, each having different carrier frequencies.

Figure 3:
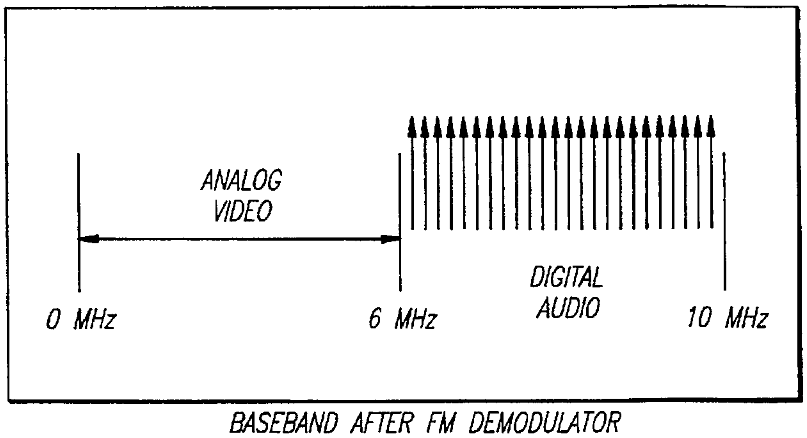
FIG. 3 is a diagram schematically illustrating a band of frequencies and schematically illustrating how an analog video signal and digital audio signals in a plurality of channels occupy this frequency band.

As shown in FIG. 3, the signals in the selected frequency band include analog video signals having a frequency range of approximately six megahertz (MHz) and digital audio signals in the remaining four megahertz (4 MHz) of the frequency band. The analog video signals are from a single video channel and the digital audio signals are from up to twenty four (24) audio channels. Each of the twenty four (24) audio channels provides digitally-encoded signals at a rate of two hundred and fifty six kilobits per second (256 kb/sec.).

The signals in the frequency band are transmitted to the satellite antenna at a suitable carrier frequency such as approximately one and one-half Gigahertz (1.5 GHz). The carrier signals are suitably modulated as by frequency modulations (FM) before being transmitted to the antenna 12. The receiving system at one of the subscriber locations is shown in FIG. 1. It includes a tuner synthesizer 14 which receives the carrier signals from the antenna 12. The carrier signals are then FM demodulated at 16.

The signals then pass through a low pass filter 18 constructed to pass the signals in a suitable range of frequencies such as approximately twelve Megahertz (12 MHz). As will be seen, this frequency range is slightly greater than the range of frequencies in the frequency band providing the analog video signal and the digital audio signals in the up to twenty four (24) channels. The signals passing through the filter 18 are introduced to an amplifier 20 providing an automatic gain control. The purpose of providing an amplifier (e.g. the amplifier 20) with automatic gain control will be described in detail subsequently in connection with the embodiment shown in FIG. 2.

The signals from the amplifier 20 pass to an analog-to-digital (A/D) converter 22. The A/D converter 22 converts the analog video signals and the digital audio signals to digital signals at a particular sampling frequency such as 24.576 MHz. This is an integral multiple of the rate at which the digital audio signals in the selected channel are provided. The digitized signals then pass to a demodulator 24 which may be provided on an integrated circuit chip. The demodulator 24 receives a programmable gain constant from a microprocessor 26. This programmable gain will be described fully in connection with the embodiment shown in FIG. 2.

The programmable gain is used by the demodulator 24 to control the gain of the amplifier 20 as a result of the passage of a control signal through a line 28 from the demodulator. The demodulator 24 also passes a signal to the A/D converter 22 to regulate the frequency at which the signals introduced to the converter are digitized. The demodulator 24 operates upon the signals introduced to the demodulator to produce an in-phase baseband signal (designated as I in FIG. 1) and quadrature baseband signal (designated as Q in FIG. 1), which correspond to the "soft-decision" outputs of the Quadrature Phase Shift Keying (QPSK) demodulator.

The I and Q signals and clock signals pass from the demodulator 24 to a decoder 28 (designated as a "Viterbi" decoder). The decoder 28 decodes the audio signals in the selected one of the up to twenty four (24) audio channels and passes the data represented by the decoded signals through a line 30 to an audio decoder stage 32. The data may pass at a suitable rate such as 192 kilobits per second. Clock signals also pass from the decoder 28 through a line 34 to the audio decoder stage 32. The Viterbi decoder 28 is well known in the art. It corrects for errors in the bit stream from the demodulator 24. The audio decoder 32 is also well known in the art. It decompresses the audio bit stream to produce the stereo sound output of the system.

Figure 2:
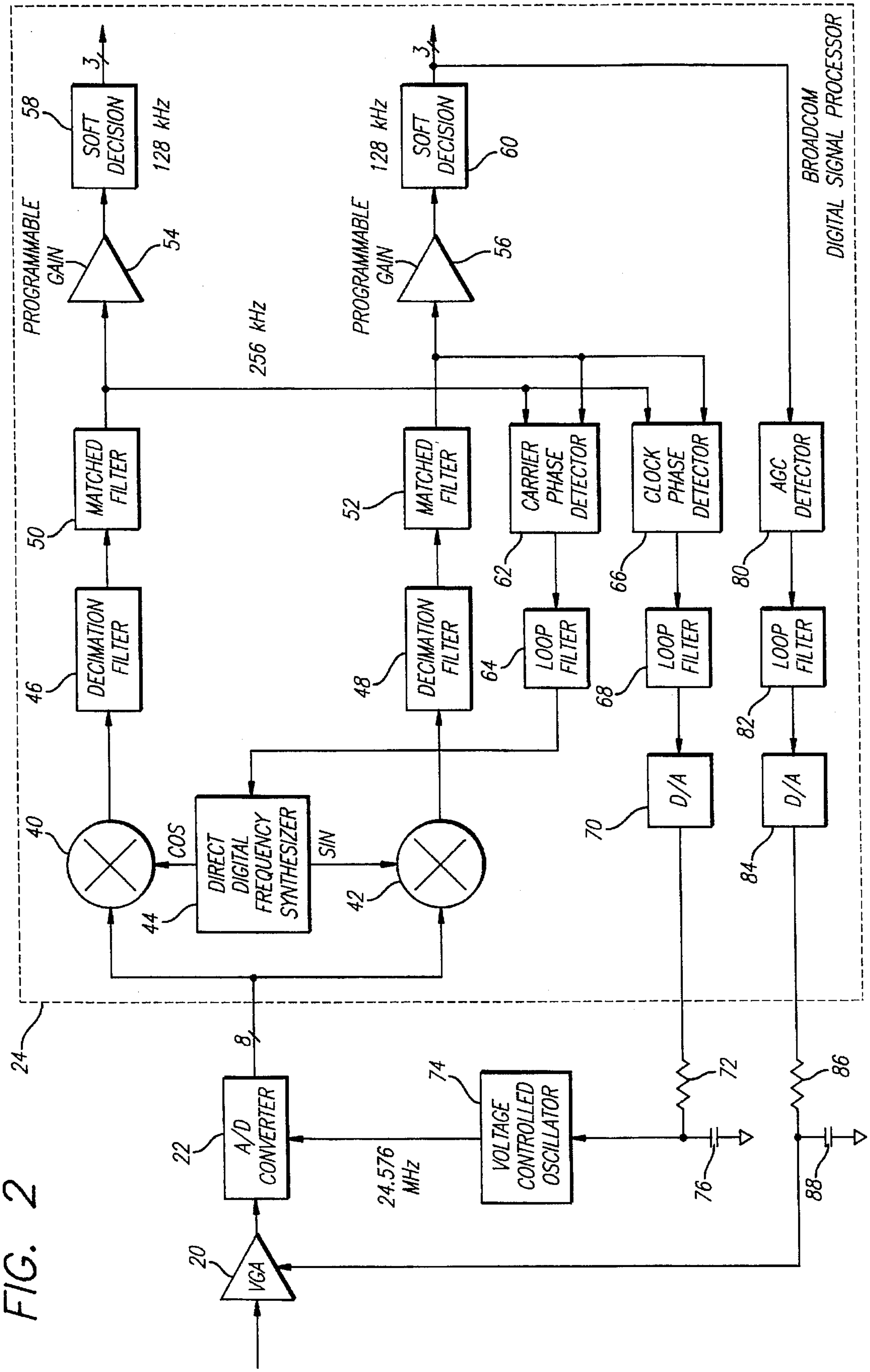
FIG. 2 is an expanded diagram, primarily in block form, of a plurality of stages included in this invention and shown on a simplified basis in FIG. 1.

FIG. 2 shows the automatic gain control stage 20 and the A/D converter 22 and also shows the demodulator 24 in increased detail, primarily in block form. The stages constituting the demodulator 24 are shown within broken lines in FIG. 2, these broken lines being designated at 24 to correspond to the designation of the demodulator in FIG. 1. The AGC amplifier 20 is shown in FIG. 2 as a variable gain amplifier (VGA). The signals from the amplifier 20 pass to the A/D converter 22. As previously described, the converter 22 digitizes the signals from the amplifier 20 at a rate of 24.576 MHz, which is an integral multiple of the 128 KHz rate at which the digital audio signals are provided. The digitized signals from the converter 22 pass to a pair of multipliers 40 and 42. The multipliers 40 and 42 also receive signals from a direct digital frequency synthesizer 44. The synthesizer provides sine and cosine signals at the rate of 24.576 MHz.

The signals from the multipliers 40 and 42 respectively pass to a pair of decimation filters 46 and 48. The filters 40 and 42 reduce the sampling frequency of the in-phase and quadrature signals to 256 KHz. This frequency corresponds to twice the baud rate at which the digital audio signals are provided in the selected digital audio channel. The signals from the filters 46 and 48 are respectively introduced to a pair of matched filters 50 and 52 which in turn respectively introduce their outputs to a pair of programmable gain amplifiers 54 and 56.

The gains of the amplifiers 54 and 56 are programmed by the microprocessor 26 shown in FIG. 1. Stages 58 and 60 designated as "Soft Decisions" respectively receive the outputs of the programmable gain stages 54 and 56 and produce the I and Q outputs for the Viterbi decoder. The outputs of the filters 50 and 52 are introduced to a carrier phase detector 62. The output from the phase detector 62 is filtered in a loop filter 64. The output from the loop filter 64 passes to the direct digital frequency synthesizer 44 to control the frequency of the signals from the synthesizer 44.

The outputs from the matched filters 50 and 52 are also introduced to a clock phase detector 66. The detector signals pass to a loop filter 68. The output from the filter passes to a digital-to-analog (D/A) converter 70. The analog signal from the converter 70 passes through a resistor 72 to a voltage controlled oscillator 74 which is also connected to an ungrounded terminal of a capacitor 76. The voltage from the oscillator 76 is introduced to the A/D converter 22 to control the frequency of the digitizing signals provided by the converter 22.

The output from the soft decision stage 60 passes to an automatic gain control (AGC) detector 80. The output from the detector 80 is introduced to a loop filter 82 which in turn passes its output to a digital-to-analog converter 84. The analog output from the converter 84 passes through a resistor 86 to the ungrounded terminal of a capacitor 88 and to the variable gain amplifier 20.

Figure 5:
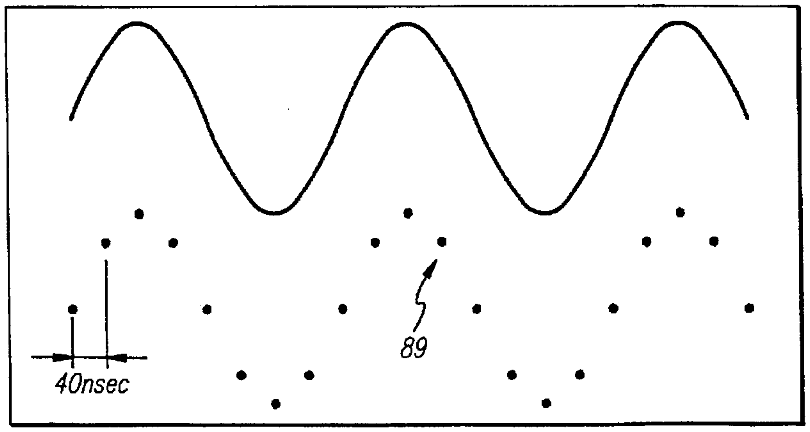
FIG. 5 illustrates how digital signals are generated at a particular frequency to represent a trigonometric function such as a sine or cosine.

The variable gain amplifier 20 receives the signals from the low pass filter 18 and provides a variable gain to these signals. The signals have a frequency range of approximately twelve Megahertz (12 MHz) which is slightly greater than the range of the frequencies in the selected band as shown in FIG. 3. The signals from the amplifier 20 are then digitized at a particular frequency such as 24.576 MHz by the converter 22. This frequency constitutes an integral multiple of 256 KHz, which is twice the baud rate at which the digital signals in the selected audio channel are transmitted from the satellite antenna (FIG. 1). The digitizing of the signals is schematically shown at 89 in FIG. 5.

The synthesizer 44 produces trigonometric functions (sine and cosine) at the particular sampling frequency such as 24.576 MHz. The sine and cosine signals are respectively mixed in the multipliers 40 and 42. The in-phase and quadrature signals from the multipliers 40 and 42 then pass respectively to the decimation filters 46 and 48 which reduce the sampling frequency of the in-phase and quadrature signals to 256 KHz. The filters 50 and 52 have frequency responses which are matched to the frequency response characteristics of the transmitted signals.

Figure 4:
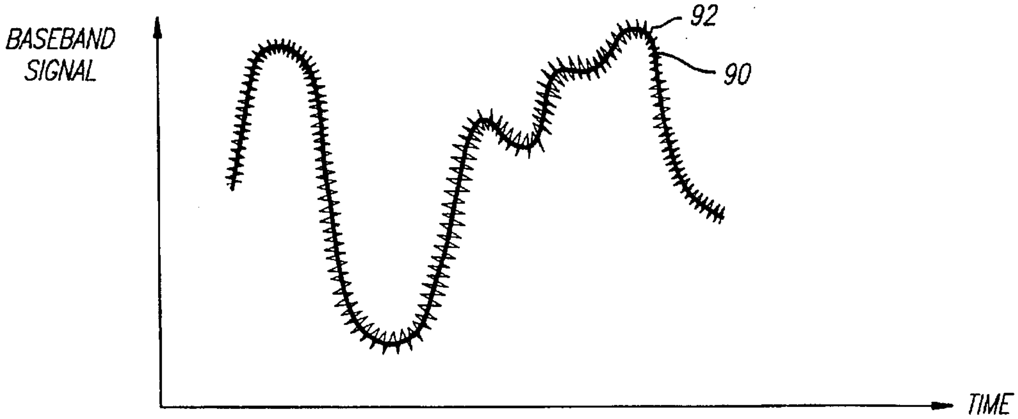
FIG. 4 illustrates how the digital audio signal in a selected one of the audio channels in the frequency band is carried on the analog video signal in the frequency band and further illustrates the importance of separating the digital audio signal from the analog digital signal to provide the digital audio signal with a high quality.

The amplifiers 54 and 56 then respectively provide a fixed programmable gain to the signals from the filters 50 and 52. This gain is programmable by the microprocessor 26 and is dependent upon the range of amplitudes of the analog video signal 40 in FIG. 4 and upon the amplitude of the digital audio signals 92 superimposed upon the analog video signal. The programmable gain is chosen so that the amplifier 20 will be able to pass the analog video signals and the digital audio signals through the range of intensities between a dark video image and a light video image and will be able to pass the digital audio signals from the selected channel without overloading the A/D converter. The signals from the amplifiers 54 and 56 respectively pass to the stages 58 and 60. The stages 58 and 60 respectively extract the appropriate 3-bit I and Q soft decision data for the Viterbi decoder 28 in FIG. 1.

The output from the stage 60 has a sampling frequency of 128 KHz. This output is introduced to the automatic gain control detector 80 which detects the amplitude of the signal. The loop filter 82 then passes the amplitude components at low frequencies in the gain detector 80, and the D/A converter 84 provides an analog voltage representative of the digital signals passed by the filter 82. The production of the analog voltage is facilitated by the operation of the RC filter defined by the resistor 86 and the capacitor 88. The analog voltage then adjusts the gain of the amplifier 20 so that the amplifier will pass the analog video signal (superimposed with the digital audio signals in the selected channel) independent of whether the video image is dark or light.

The detector 66 receives the signals from the filters 50 and 52 and detects the zero crossings of these signals. The zero crossings are averaged by the filter 68. The signals from the filter 68 are converted to a corresponding analog voltage by the digital-to-analog converter 70. The conversion of the signals from the filter 68 to a corresponding analog voltage is facilitated by the operation of the RC filter provided by the resistor 72 and the capacitor 76. The analog voltage is introduced to the voltage controlled oscillator 74 which provides oscillatory signals at a frequency dependent upon the magnitude of the voltage introduced to the oscillator. In this way, the oscillator 74 regulates at 24.576 MHz the frequency at which the signals from the amplifier 20 are digitized by the converter 22.

The signals from the filters 50 and 52 are also introduced to the carrier phase detector 62. The detector 62 detects the phase error between the input signal to the demodulator 24 and the sine and cosine signals generated by the direct digital frequency synthesizer 44. The value of this phase error is computed as $$\text{sgn}(I)Q-\text{sgn}(Q)I$$

where I and Q are the in-phase and quadrature outputs of the matched filters 50 and 52, respectively, and sgn (I)=+1 if I is positive and sgn(I)=−1 if I is negative.

The detected phase error signal from the detector 62 is filtered by the loop filter 64 and the filtered signals are introduced to the synthesizer 44. This signal regulates the frequency of the sine and cosine signals which are mixed in the multipliers 40 and 42 with the digitized signals from the converter 22. As will be appreciated, the sampling frequency of the trigonometric functions from the multipliers 40 and 42 is 24.576 MHz, the same frequency at which the signals from the amplifier 20 are digitized by the converter 22.

Figure 6:
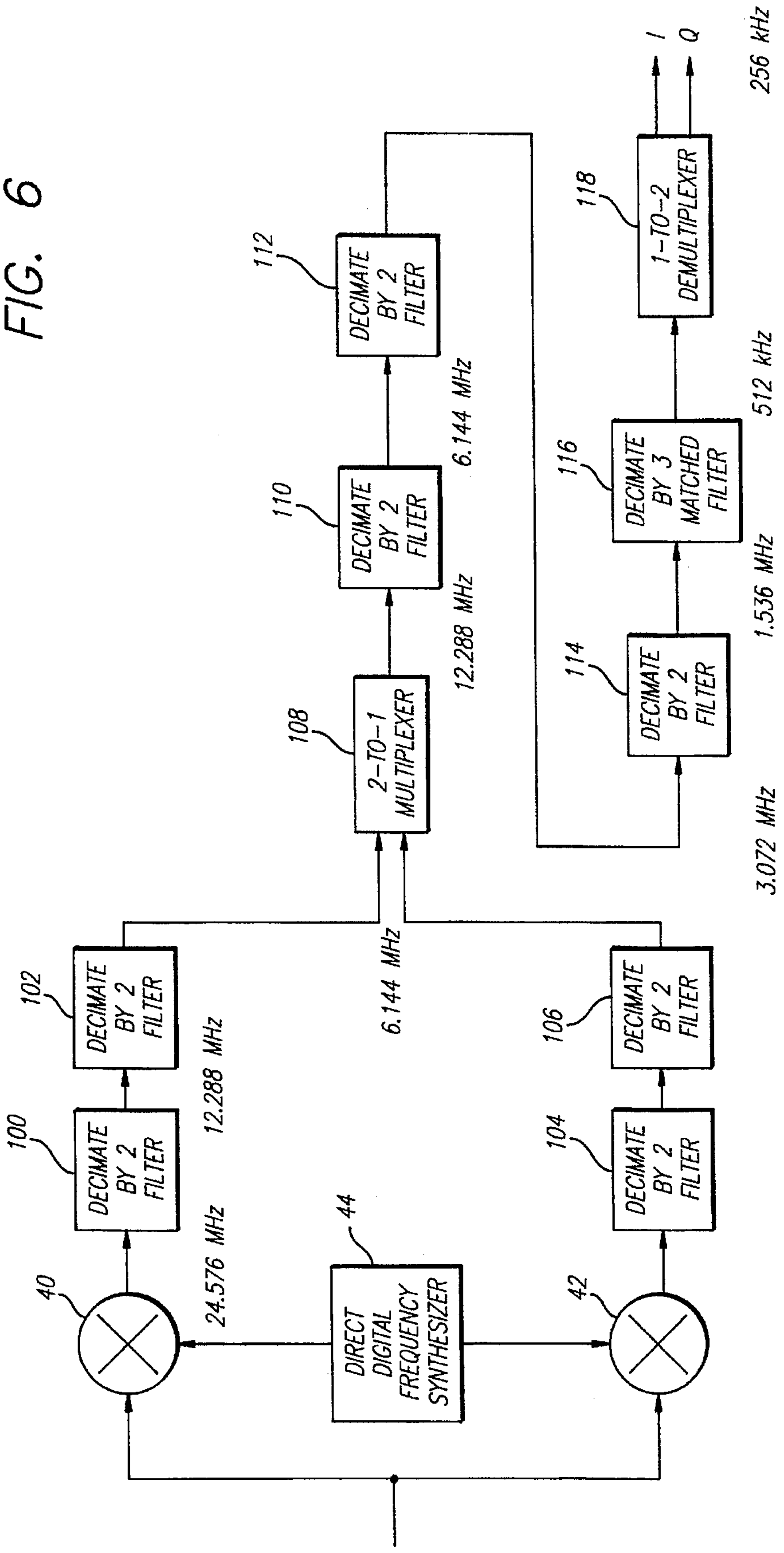
FIG. 6 is a circuit diagram, primarily in block form, showing in additional detail circuitry provided on a simplified basis in FIG. 3 for reducing the sampling frequency of the baseband signals.

FIG. 6 illustrates the construction of the decimation filters 46 and 48 in additional detail. FIG. 6 shows the synthesizer 44 and the multipliers 40 and 42. FIG. 6 also shows how decimation filters 46 and 48 are composed of seven decimate-by-2 filters 100, 102, 104, 106, 110, 112 and 114. Each one of these decimate-by-2 stages reduces the sampling frequency by a factor of 2. The matched filters 50 and 52 are combined into a single decimate-by-3 matched filter stage 116 whose output is demultiplexed into the 256 KHz I and Q baseband signals by stage 118.

The hardware complexity has been significantly reduced by the operation of the multiplexer stage 108 in combining the outputs of filter stages 102 and 106 into a single signal. The subsequent filters 110, 112, 114 and 116 are then performing the filtering for both the in-phase (I) and quadrature (Q) signals without having to double the hardware complexity. Internally the filters are operating at twice their normal speed with the I channel filtering performed on the even clock cycles and the Q channel filtering performed on the odd clock cycles.

The system and method described above have certain important advantages. They insure that the digital audio signals in a selected channel in a particular frequency band will be recovered from the analog video signal and the other up to twenty three (23) digital audio signals in the particular frequency band such that there will be little, if any, noise in such recovered signals. The system and method of this invention accomplish this in part by regulating the gain of the variable gain amplifier 24 in accordance with a programmable gain provided by the microprocessor 26 which is independent of any large amplitude fluctuations in the video signal. The system and method of this invention also accomplish this in part by digitizing (see A/D converter 22) the entire received video and digital audio signals and using narrow band digital decimation filters (e.g. 46 and 48) to extract a single audio channel and filter out all interference from the other audio channels and the video channel. The system and method of this invention further accomplish this in part by producing trigonometric signals (see stages 40, 42 and 44) at a frequency corresponding to the rate of providing such digital audio signals and by regulating the frequency of such trigonometric signals at such rate.

Although this invention has been disclosed and illustrated with reference to particular embodiments, the principles involved are susceptible for use in numerous other embodiments which will be apparent to persons skilled in the art. The invention is, therefore, to be limited only as indicated by the scope of the appended claims.

We claim:

1. In combination in a direct broadcast system having a plurality of channels each with a particular range of frequencies and with an analog video signal occupying a portion of the range of frequencies in the channel and with a plurality of digital audio signals occupying the remainder of the range of frequencies in the channel, the combination being provided to select a particular one of the digital audio signals in the channel, receiving means for receiving the analog video signals and the digital audio signals in the channel, digital processing means for digitally processing the analog video signals and the digital audio signals at a particular frequency, control means responsive to the digitally processed analog video signals and the digitally processed digital audio signals from the digital processing means for controlling the operation of the digital processing means to maintain the digital processing of the analog video signals and the digital audio signals at the particular frequency, and additional processing means responsive to the digitally processed digital audio signals from the digital processing means for processing such digitally processed digital audio signals to recover the audio information in the particular channel.

2. In a combination as recited in claim 1 wherein the control means includes frequency reducing means for reducing the frequency of the digitally processed signals after the digital processing of the signals at the particular frequency, and the control means includes means responsive to the frequency reduced signals for feeding such signals back to the digital processing means for regulating the digitally processed signals at the particular frequency.

3. In a combination as set forth in claim 1 wherein the digital processing means includes converting means for providing a conversion of the signals from the receiving means to digital signals at the particular frequency and wherein the control means includes means responsive to the digital signals from the converting means for regulating at the particular frequency the digital processing of the signals from the receiving means.

4. In a combination as set forth in claim 1 wherein the digital processing means include converting means for converting the signals from the receiving means to digital signals at the particular frequency and wherein demodulating means demodulate the digital signals at the particular frequency from the converting means to produce quadrature components of the digital signals at the particular frequency and wherein additional frequency reducing means reduce the frequency at which the quadrature components of the digital signals from the demodulating means are produced and wherein regulating means regulate the operation of the digital processing means in regulating at the particular frequency the digital processing of the signals from the receiving means.

5. In a combination as set forth in claim 4 wherein the regulating means include means for converting the digital signals from the additional frequency reducing means to analog signals and include means for introducing the analog signals to the digital processing means to regulate at the particular frequency the digital processing of the signals from the receiving means.

6. In combination in a direct broadcast system having a plurality of channels each with a particular range of frequencies and with an analog video signal occupying a portion of the range of frequencies in the channel and with a plurality of digital audio signals occupying the remainder of the range of frequencies in the channel, the combination being provided to select a particular one of the digital audio signals in the channel, receiving means for receiving the analog video signals and the digital audio signals, amplifying means for amplifying the analog video signals and the digital audio signals with a variable gain, digital processing means for digitally processing the amplified signals from the amplifying means, gain programmable means responsive to the digitally processed signals from the digital processing means for providing to such digitally processed signals a gain programmable in accordance with the range of amplitudes of the analog video signals superimposed upon the plurality of digital audio signals, and regulating means responsive to the signals from the gain programmable means for regulating the gain in the amplitudes of the signals from the amplifying means in accordance with the programmable gain provided by the gain programmable means.

7. In a combination as set forth in claim 6 wherein the regulating means includes detecting means responsive to the signals from the regulating means for detecting the gain of the signals from the gain programmable means and includes analog signal means responsive to the signal gain detected by the detecting means for providing an analog signal and includes means for regulating the gain of the amplification provided by the amplifying means in accordance with the analog signals provided by the analog signal means.

8. In a combination as set forth in claim 6 wherein the digital processing means includes digitizing means for digitizing the signals from the amplifying means at a particular frequency and includes quadrature component means responsive to the signals from the digitizing means for producing quadrature components of such signals and includes means responsive to the signals from the quadrature component means for regulating the operation of the digitizing means in obtaining the particular frequency for digitizing the signals from the amplifying means.

9. In a combination as set forth in claim 8 wherein the quadrature component means produces the quadrature components of the signals from the digitizing means at the particular frequency and wherein the quadrature component means includes means responsive to the quadrature components of the signals from the quadrature component means for regulating the production of the quadrature components of the digital signals at the particular frequency.

10. In a combination as set forth in claim 6 wherein the digital processing means includes digitizing means for digitizing the signals from the amplifying means at a first particular frequency and includes quadrature component means responsive to the signals from the digitizing means for producing quadrature components of such signals at the particular frequency and includes frequency reducing means responsive to the signals from the quadrature component means for reducing the frequency of the quadrature components of such signals to a second particular frequency lower than the first particular frequency and includes means responsive to the signals from the frequency reducing means for regulating the particular frequency at which the quadrature components of the digital signals are produced by the quadrature component means.

11. In a combination as set forth in claim 10 wherein means are responsive to the signals from the frequency reducing means for regulating the particular frequency at which the signals from the amplifying means are digitized.

12. In combination in a direct broadcast system having a plurality of channels each with a particular range of frequencies and with an analog video signal occupying a portion of the range of frequencies in the channel and with a plurality of digital audio signals occupying the remainder of the range of frequencies in the channel to select a particular one of the digital audio signals in the channel, receiving means for receiving the analog video signals and the digital audio signals, variable gain means for providing a variable gain to the received signals, converting means for converting the signals from the variable gain means to digital signals at a particular frequency, quadrature component means for producing quadrature components of the signals digitally converted at the particular sampling frequency by the converting means, frequency reducing means for reducing the sampling frequency of the quadrature components of the digitally converted signals from the quadrature component means to a particular value, programmable gain means for providing a programmable gain in the signals from the frequency reducing means in accordance with the range of amplitudes of the analog video signals superimposed upon the plurality of the digital audio signals in the channel, and gain regulating means responsive to the programmable gain from the programmable gain means for regulating the gain provided by the variable gain means.

13. In a combination as set forth in claim 12 wherein the gain regulating means includes an automatic gain control detector, a loop filter and a digital-to-analog converter.

14. In a combination as set forth in claim 12 wherein frequency regulating means are responsive to the signals from the frequency reducing means for regulating the particular frequency at which the signals from the variable gain means are converted to digital signals by the converting means.

15. In a combination as set forth in claim 12 wherein means are responsive to the signals from the frequency reducing means for regulating the particular frequency at which the quadrature components of the digital signals are produced by the quadrature component means.

16. In a combination as set forth in claim 12 wherein the quadrature components of the digital signals produced by the quadrature component means provide sine and cosine functions and wherein the frequency reducing means includes means for reducing the frequency of the quadrature signals and combining means for combining the quadrature components of the digital signals and additional frequency reducing means for reducing the sampling frequency of the signals from the combining means and reconstituting means for reconstituting the individual quadrature components of the digital signals at the reduced frequency from the additional frequency reducing means.

17. In a combination as set forth in claim 16 wherein the gain regulating means includes an automatic gain control detector, a loop filter and a digital-to-analog converter, means are responsive to the signals from the reconstituting means for regulating the particular frequency at which the signals from the variable gain means are converted to digital signals by the converting means, and means are responsive to the signals from the frequency reducing means for regulating the particular frequency at which the quadrature components of the digital signals are produced by the quadrature component means.

18. In combination for use in a direct broadcast system having a channel with a particular range of frequencies and with an analog video signal occupying a portion of the range of frequencies in the channel and with a plurality of digital audio signals occupying the remainder of the range of frequencies in the channel to select a particular one of the audio signals in the channel, receiving means for receiving the analog video signals and the digital audio signals in the channel, digitizing means for digitizing the received signals, quadrature component means for producing quadrature components of the digitized signals, frequency reducing means for reducing the frequency of the quadrature components of the signals from the quadrature component means to a frequency related to the rate at which the digital audio signals are provided, and regulation facilitating means responsive to the quadrature components of the digital signals from the frequency reducing means for operating upon the receiving means and digitizing means to facilitate the regulation of the frequency of the signals from the frequency reducing means at the frequency related to the rate at which the digital audio signals are provided.

19. In a combination as set forth in claim 18 wherein the digitizing means digitizes the received signals at a particular frequency, and the regulation facilitating means includes feedback means responsive to the signals from the frequency reducing means for feeding signals back to the digitizing means to regulate the operation of the digitizing means in obtaining the digitizing of the received signals at the particular frequency.

20. In a combination as set forth in claim 18 wherein the regulation facilitating means includes feedback means responsive to the signals from the frequency reducing means for feeding signals back to the quadrature component means to regulate the operation of the quadrature component means in producing the quadrature components of the signals from the quadrature component means at the particular frequency.

21. In a combination as set forth in claim 20 wherein the regulation facilitating means includes regulating means responsive to the signals from the quadrature component means for feeding signals back to the digitizing means to regulate the operation of the digitizing means in obtaining the digitizing of the received signals at the particular frequency.

22. In a combination as set forth in claim 21 wherein the regulating means includes converting means for converting the digitized signals to analog signals and includes a voltage controlled oscillator responsive to the analog signals from the converting means for producing signals at the particular frequency to obtain the digitizing of the received signals at the particular frequency.

23. In a combination as set forth in claim 18, means for regulating the gain of the received signals before the digitizing of the received signals by the digitizing means.

24. In a combination as set forth in claim 21, including, programmed gain means responsive to the signals from the frequency reducing means for providing a programmed gain of such signals in accordance with the range of amplitudes of the analog video signals superimposed with the plurality of the digital audio signals in the channel, and means responsive to the signals from the programmed gain means for regulating the gain of the received signals before the digitizing of the received signals by the digitizing means.

25. In combination in a direct broadcast system having a plurality of channels each with a particular range of frequencies and with an analog video signal occupying a portion of the range of frequencies in the channel and with a plurality of digital audio signals occupying the remainder of the range of frequencies in the channel to select a particular one of the digital audio signals, receiving means for receiving the analog video signals and the digital audio signals, digitizing means for digitizing the received signals, quadrature component means for producing quadrature components of the digitized signals from the second means, frequency reducing means for reducing the frequency of the signals from the quadrature component means to the frequency of the particular one of the digital audio signals in the channel, and recovery facilitating means responsive to the signals from the frequency reducing means for operating upon the digitizing means and the quadrature component means to facilitate the recovery of the audio signals in the particular audio channel.

26. In a combination as set forth in claim 25 wherein the recovery facilitating means includes a servo feedback loop responsive to the signals from the frequency reducing means for operating upon the digitizing means to obtain the digitizing of the received signals at a particular frequency.

27. In a combination as set forth in claim 25 wherein the recovery facilitating means includes a servo feedback loop responsive to the signals from the frequency reducing means for producing trigonometric signals at a particular frequency.

28. In a combination as set forth in claim 27 wherein the servo loop is a first servo loop and wherein the recovery facilitating means includes a second servo loop responsive to the signals from the frequency reducing means for operating upon the digitizing means to obtain the digitizing of the received signals at the particular frequency.

29. In a combination as set forth in claim 25, programmed gain control means for providing the received signals with a programmed gain control before the digitizing of the received signals, the programmed gain control being dependent upon the range of amplitudes of the analog video signal and upon the modulations of these amplitudes by the plurality of the digital audio signals in the channel.

30. In a combination as set forth in claim 28, programmed gain control means operative upon the signals from the frequency reducing means for providing these signals with a programmed gain control dependent upon the range of amplitudes of the analog video signals and upon the modulations of these amplitudes by the plurality of the digital audio signals in the channel, and a third servo loop responsive to the signals from the programmed gain control means for regulating the gain of the received signals before the digitizing of the received signals by the digitizing means.

31. In a combination as set forth in claim 1, the frequency reducing means constituting first frequency reducing means, the digitizing means including second frequency reducing means for reducing the frequency of the digital processing from that provided by the digitizing means, and the quadrature component means being responsive to the signals from the recovery facilitating means for controlling the operation of the digitizing means to maintain the digital processing of the analog video signals and the digital audio signals at the particular frequency.

32. In a combination as set forth in claim 4, demodulating means responsive to the quadrature components of the digital signals at the reduced frequency for regulating the operation of the demodulating means in demodulating the signals at the particular frequency to produce the quadrature components of the digital signals at the particular frequency.

33. In a combination as set forth in claim 32, the frequency reducing means including means for reducing the frequency of the quadrature components of the digital signals from the particular frequency and including combining means for combining the quadrature components of the digital signals at the reduced frequency and including means for further reducing the frequency of the quadrature components of the digital signals from the combining means and further including means for reconstructing the quadrature components of the digital signals at the further reduced frequency, and the demodulating means being responsive to the quadrature components of the digital signals at the further reduced frequency for regulating the operation of the demodulating means in demodulating the signals at the particular frequency to produce the quadrature components of the digital signals at the particular frequency.

34. In a combination as set forth in claim 18, the frequency reducing means including additional frequency reducing means for decreasing the frequency of the quadrature components of the digital signals from the quadrature component means and including combining means responsive to the quadrature components of the signals at the decreased frequency for combining such signals and including frequency decreasing means for further decreasing the frequency of the combined signals from the combining means and including reconstituting means responsive to the combined signals from the frequency decreasing means for reconstituting the quadrature components of the digital signals at the further decreased frequency, and the regulation facilitating means being responsive to the quadrature components of the digital signals from the reconstituting means for operating upon the receiving means and the digitizing means to facilitate the regulation of the frequency of the signals by the frequency reducing means at the frequency related to the rate at which the digital audio signals are provided.

35. In a combination as set forth in claim 33, the converting means including means responsive to the signals from the demodulating means for feeding signals back to the digital processing means to regulate the operation of the digital processing means in obtaining the digitizing of the received signals at a particular frequency.

36. In a combination as set forth in claim 25, the frequency reducing means including means for reducing the frequency of the quadrature components of the digital signals from the quadrature component means and including combining means responsive to the quadrature components of the signals at the decreased frequency for combining such signals and including means for further decreasing the frequency of the combined signals from the combining means and including reconstituting means responsive to the combined signals from the last mentioned means for reconstituting the quadrature components of the digital signals at the further decreased frequency, and the recovery facilitating means being responsive to the quadrature components of the digital signals from the reconstituting means for operating upon the receiving means and the digitizing means to facilitate the regulation of the frequency of the signals by the frequency reducing means at the frequency related to the rate at which the digital audio signals are provided.

* * * * *